T. A. KLENKE & F. N. ROEHRICH.
VEHICLE.
APPLICATION FILED APR. 4, 1908.
1,066,919.
Patented July 8, 1913.
10 SHEETS—SHEET 10.
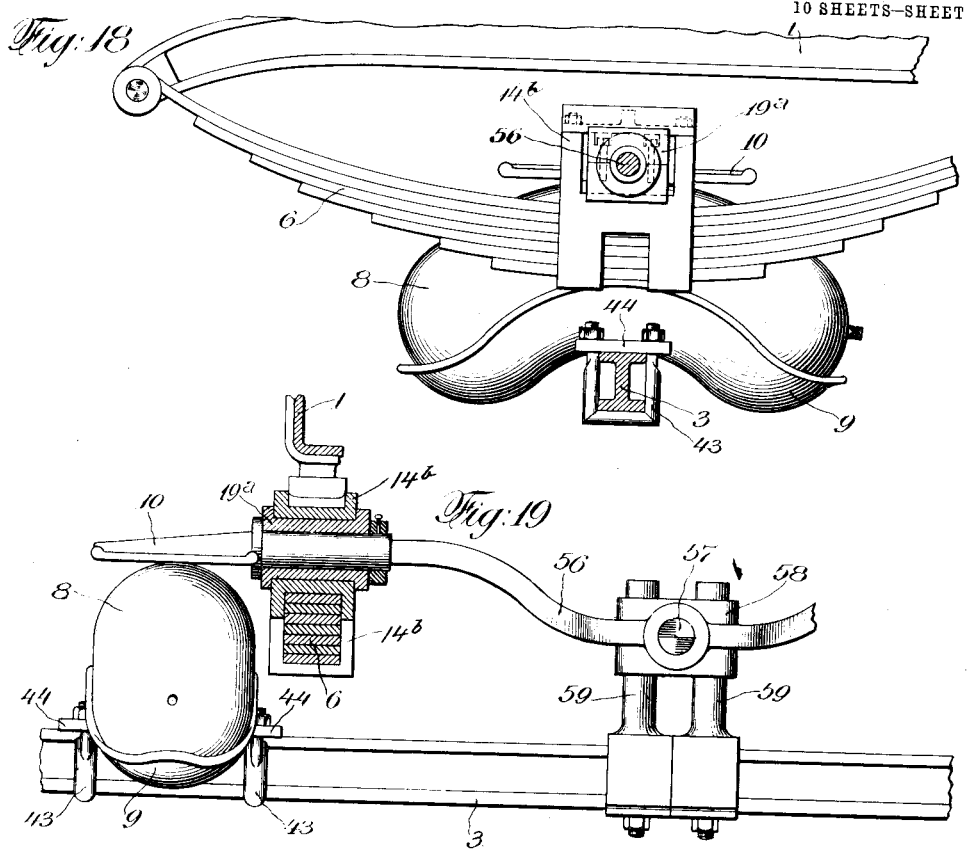
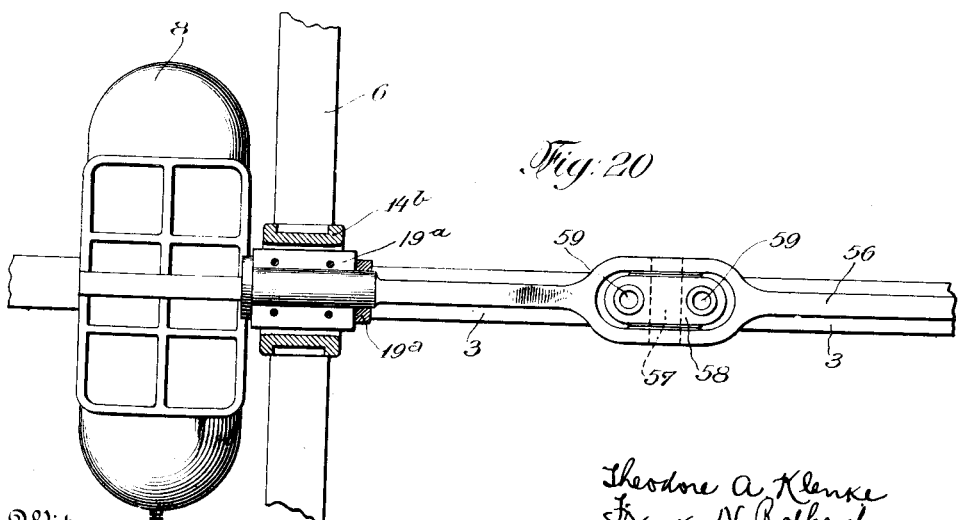

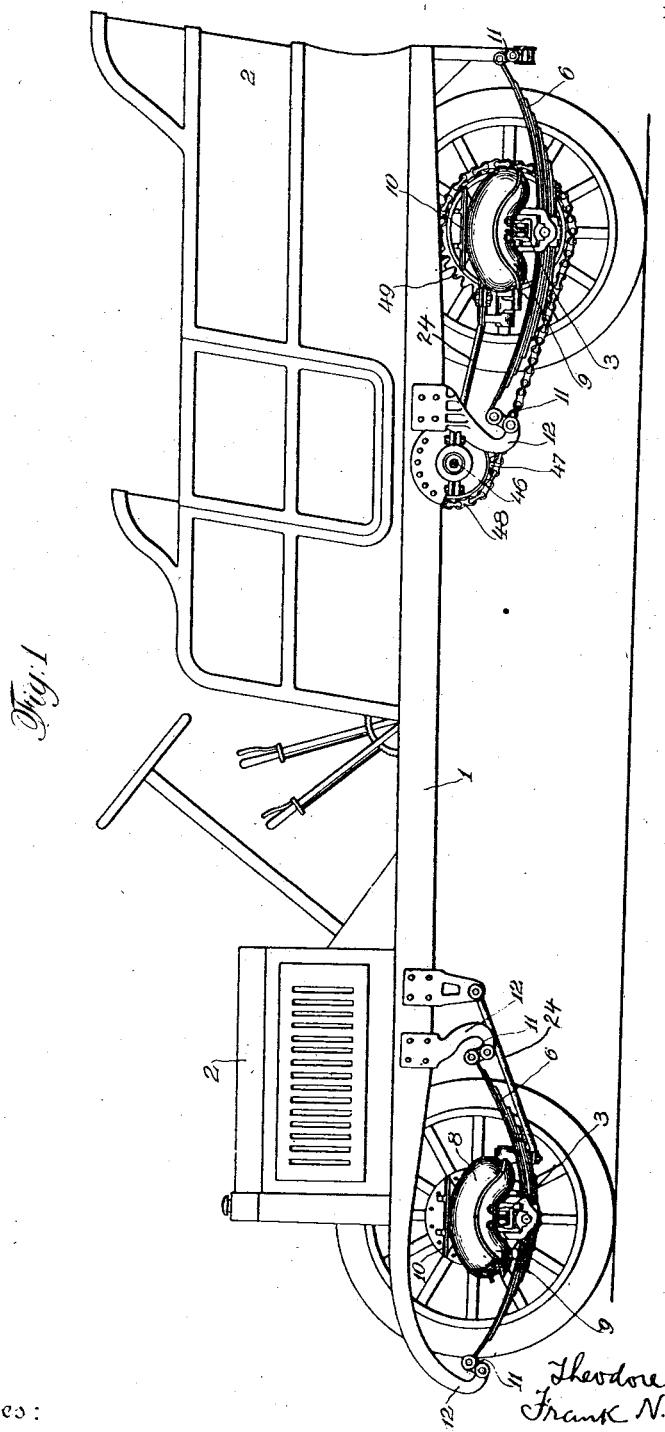

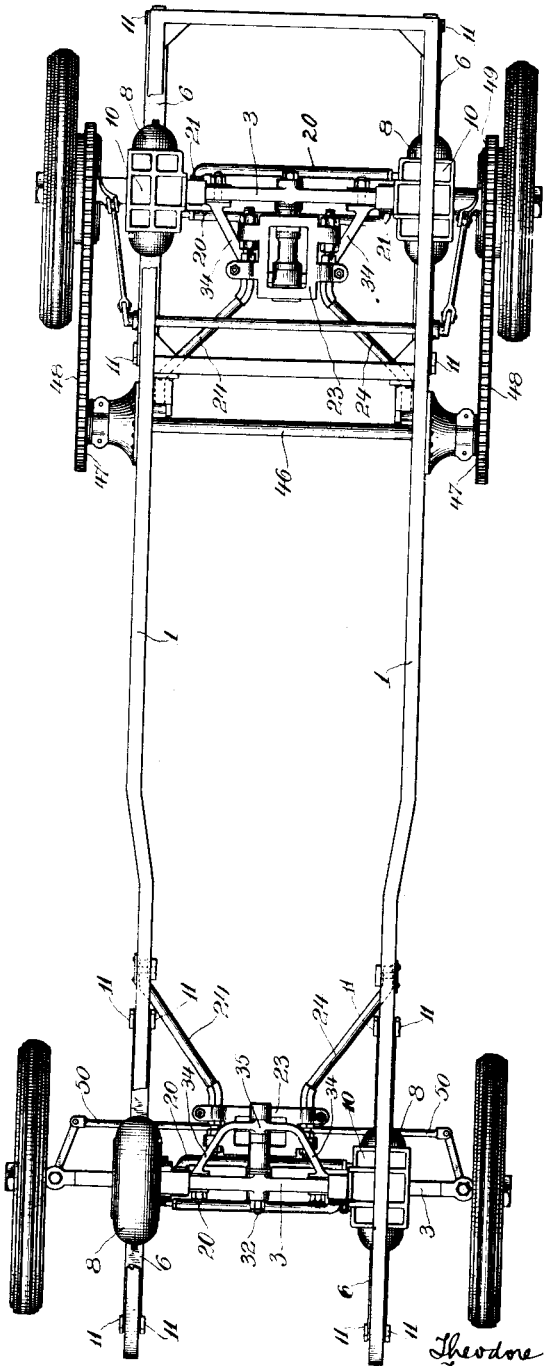

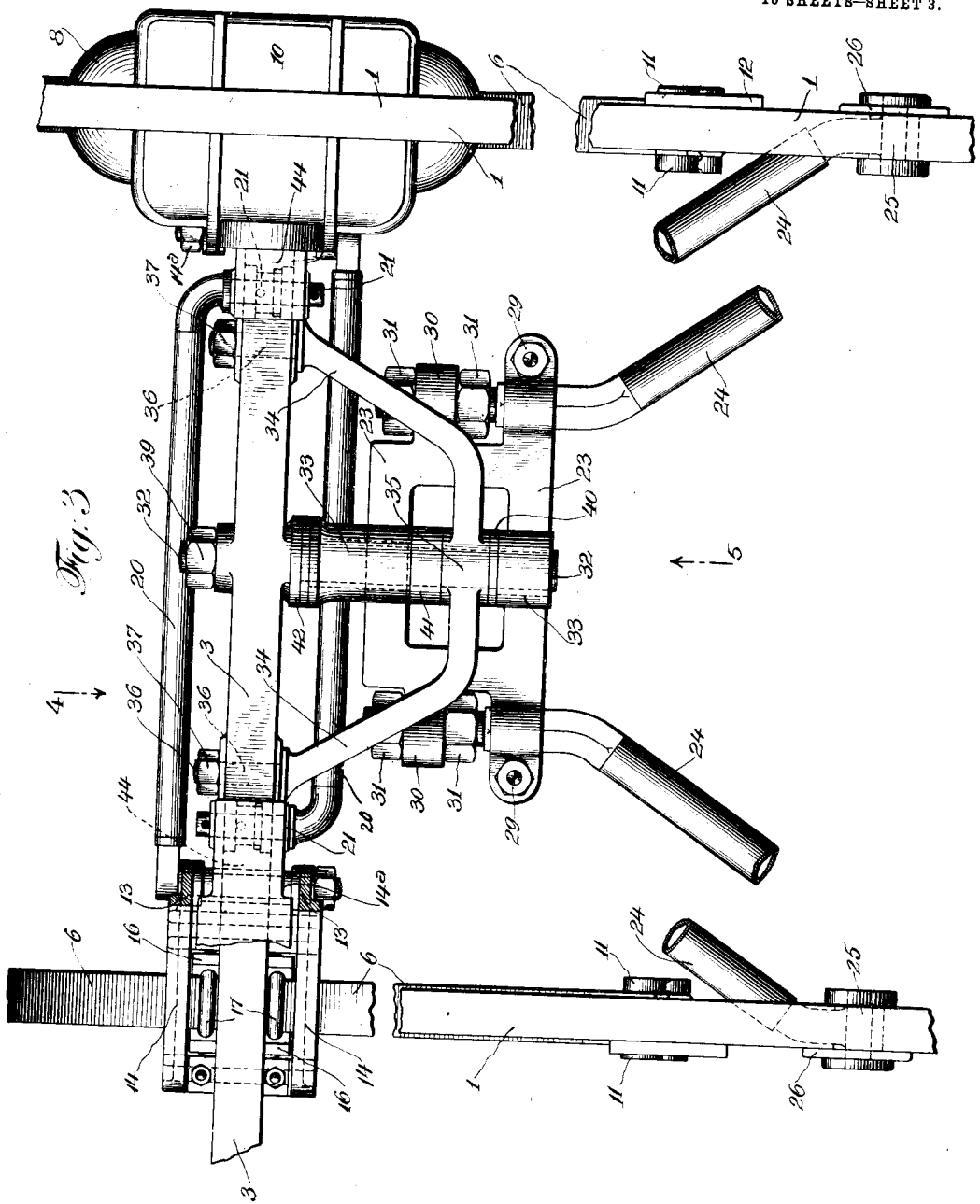

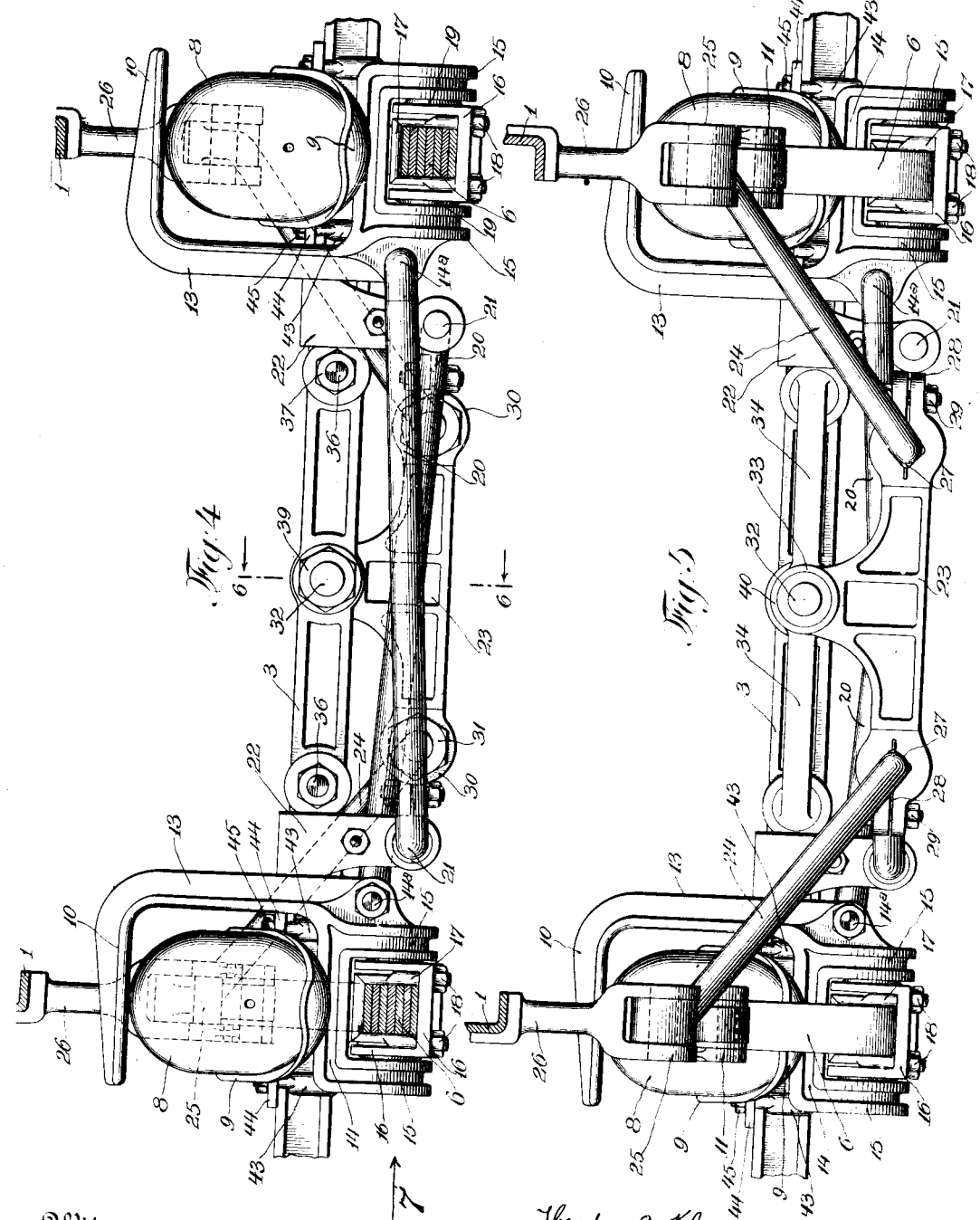

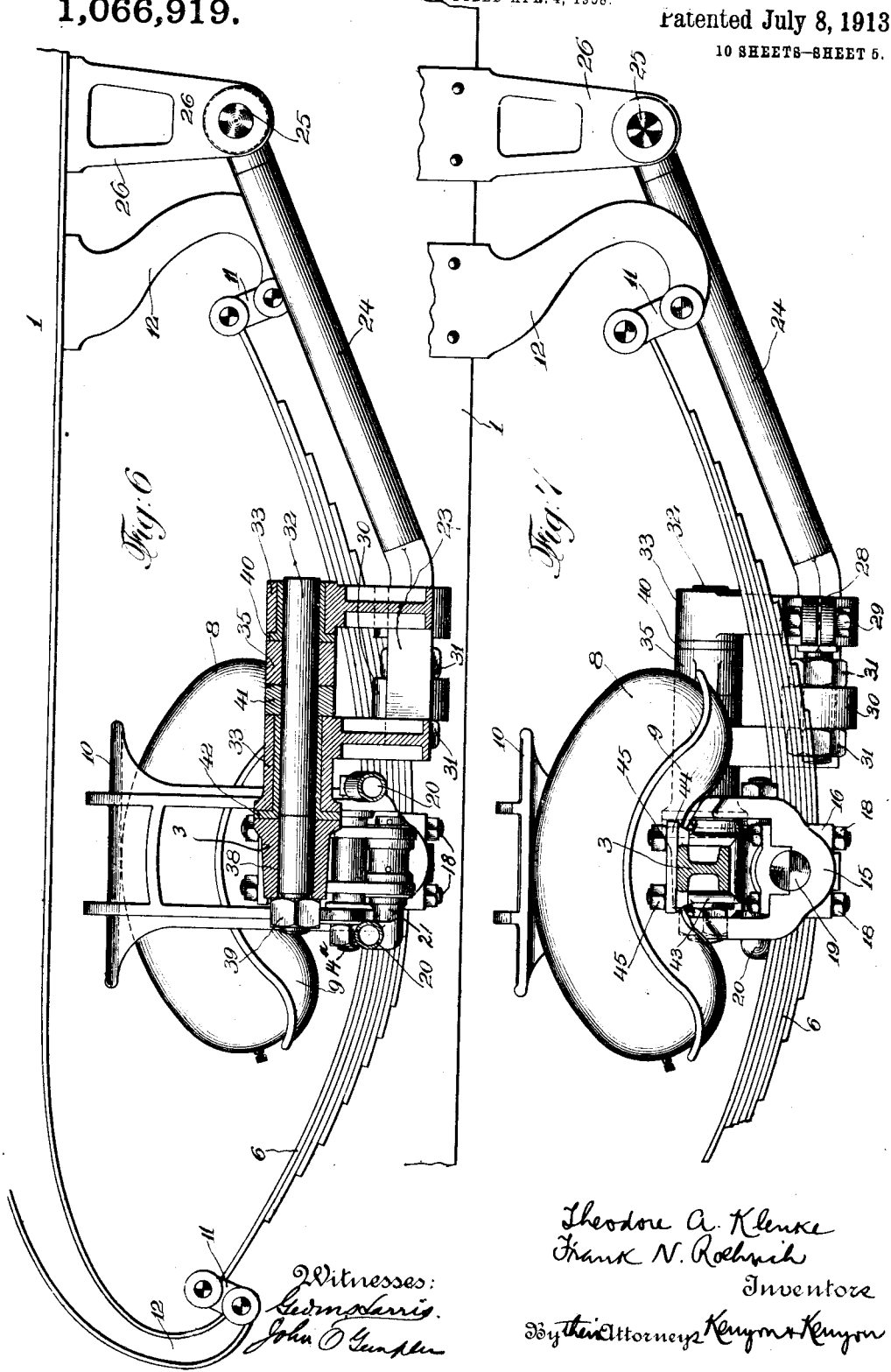

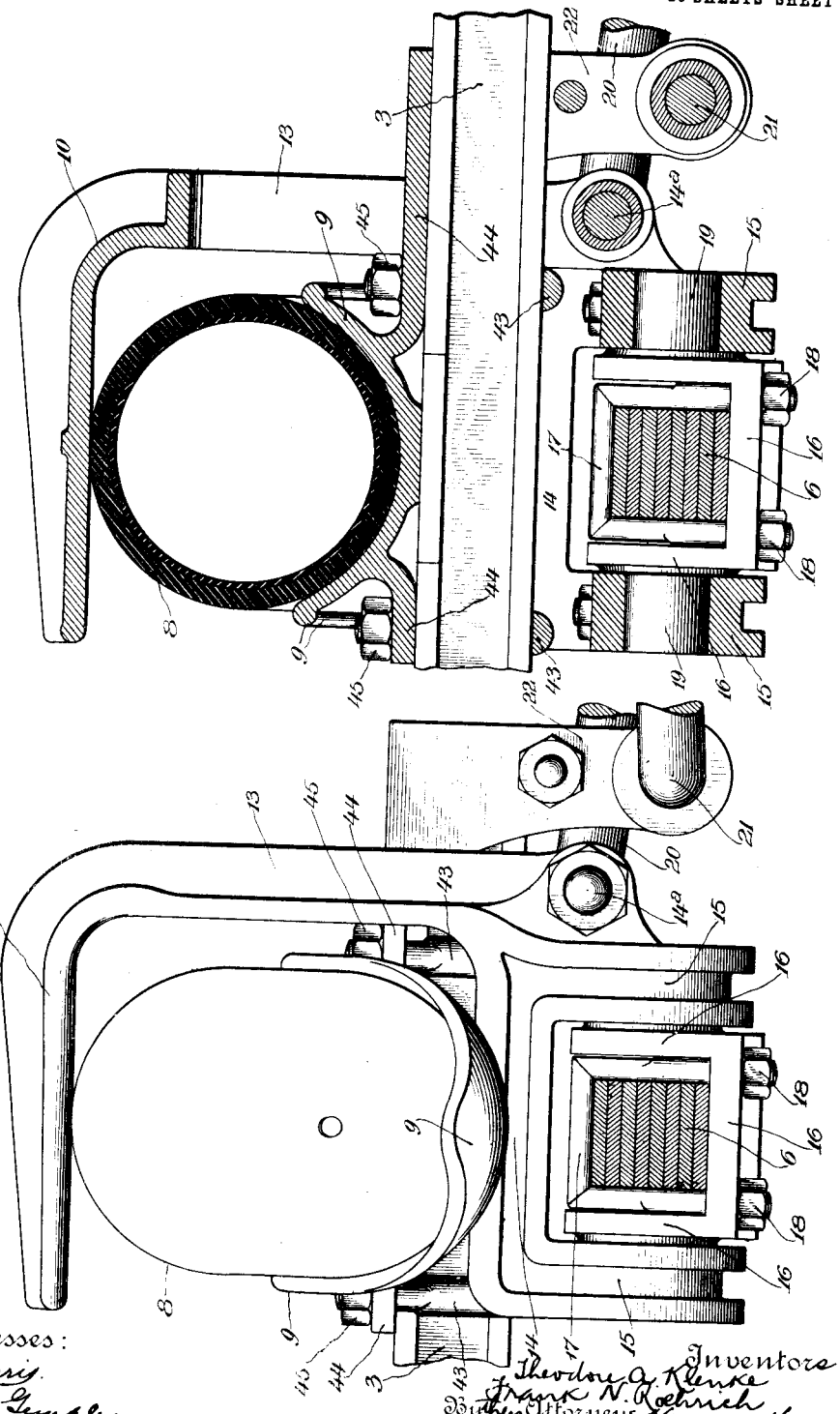

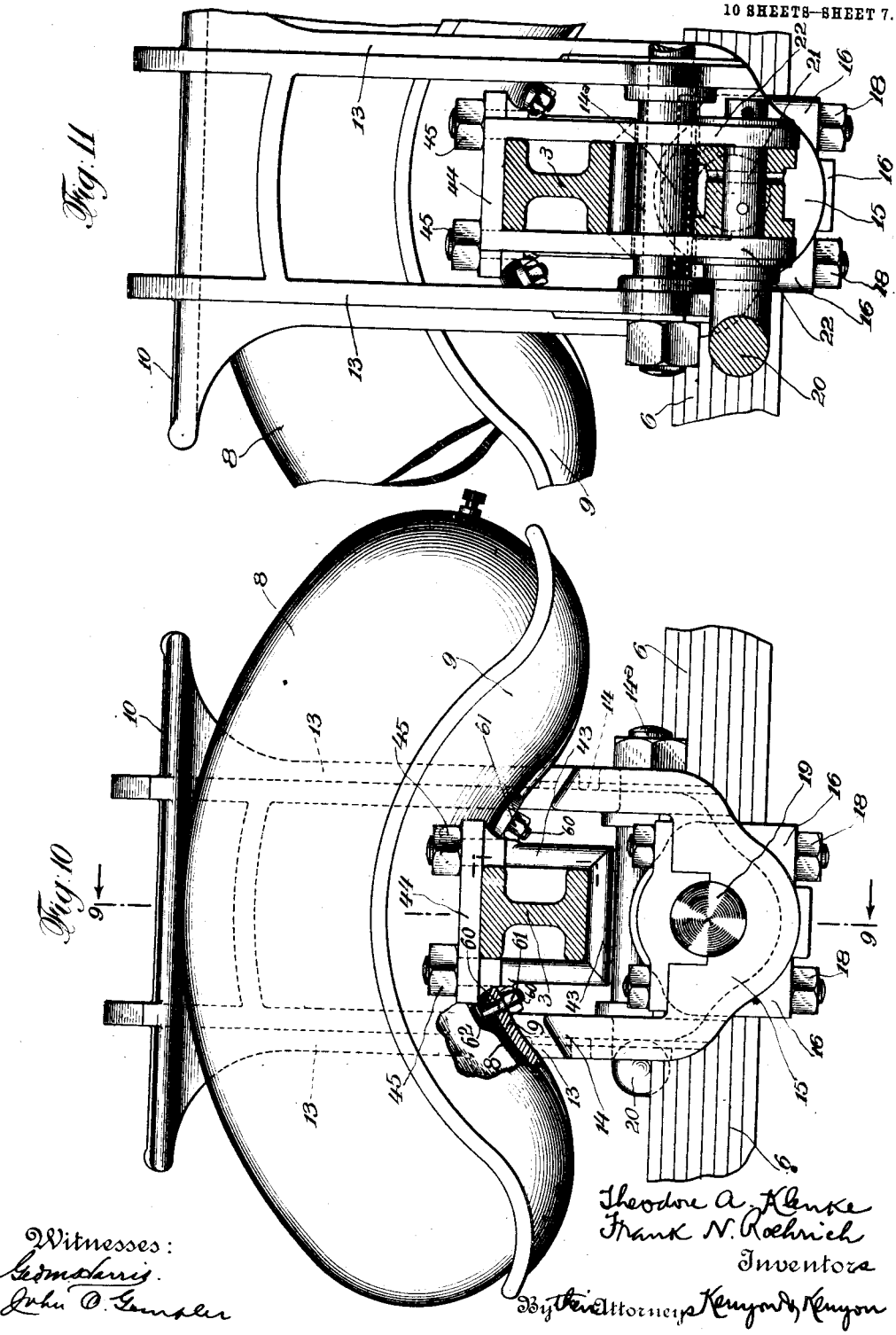

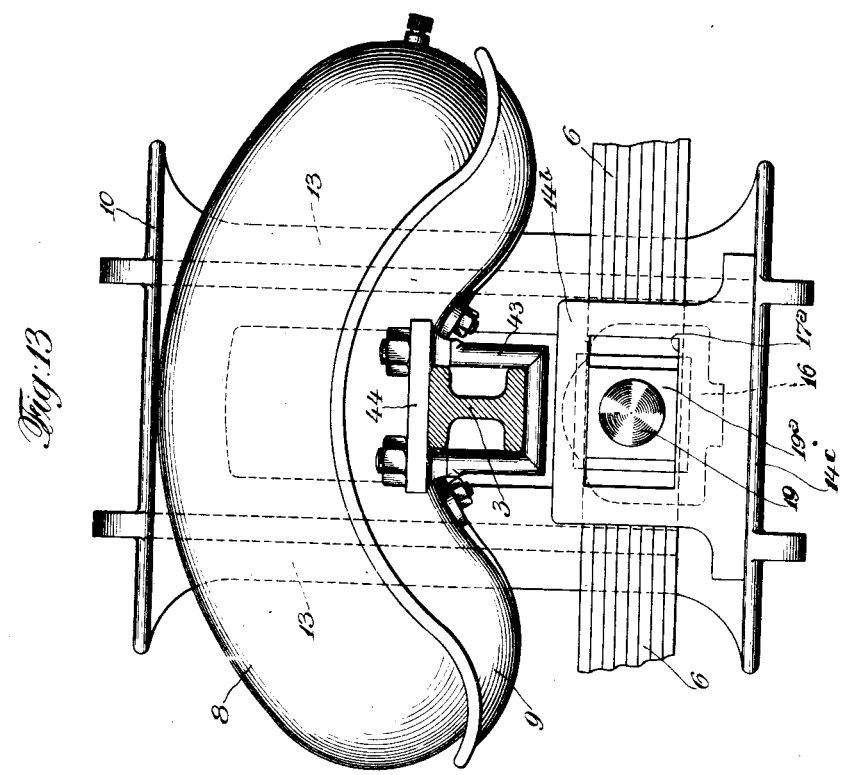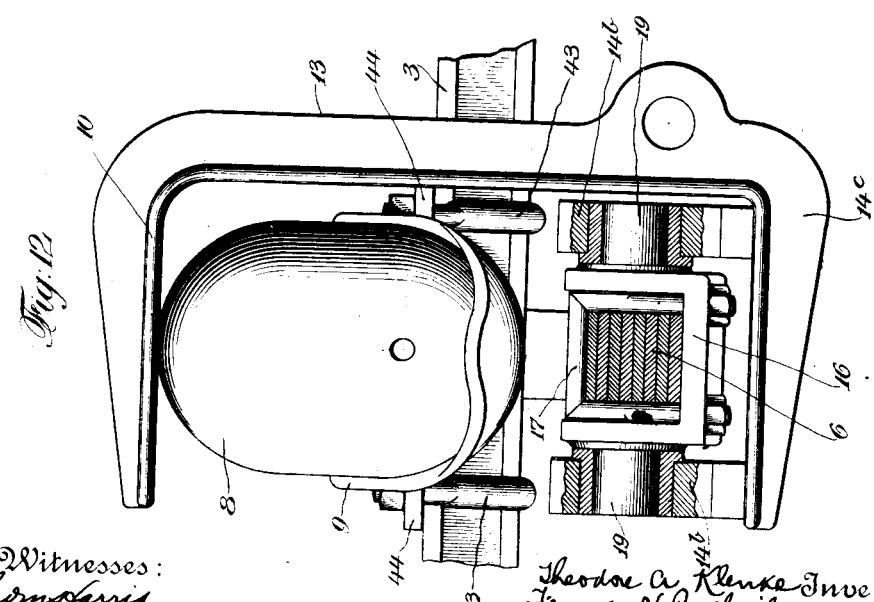

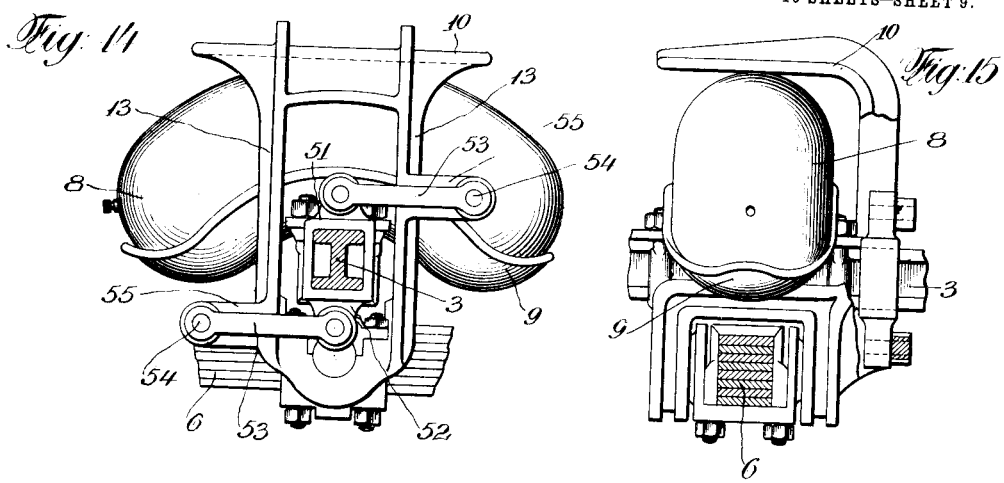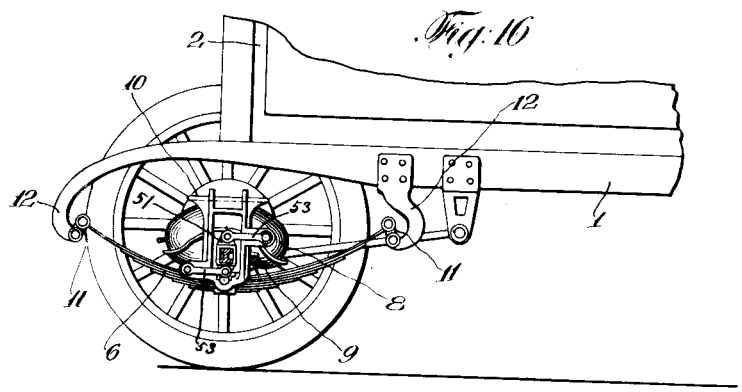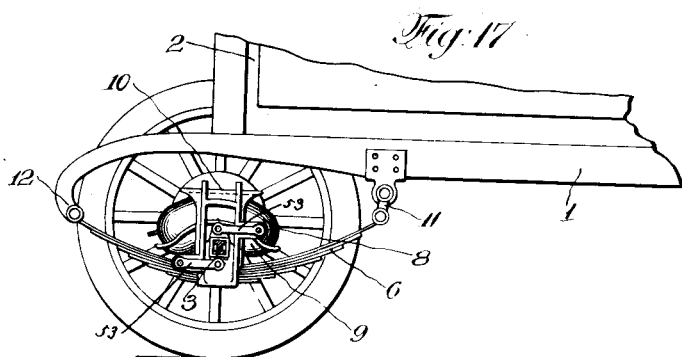

UNITED STATES PATENT OFFICE.

THEODORE A. KLENKE, OF NEW YORK, AND FRANK N. ROEHRICH, OF BROOKLYN, NEW YORK, ASSIGNORS, BY MESNE ASSIGNMENTS, TO KLENKE CUSHION AXLE COMPANY, A CORPORATION OF NEW YORK.

VEHICLE.

1,066,919.   Specification of Letters Patent.   Patented July 8, 1913.

Application filed April 4, 1908. Serial No. 425,149.

*To all whom it may concern:*

Be it known that we, THEODORE A. KLENKE, a citizen of the United States, and resident of the city, county, and State of New York, and FRANK N. ROEHRICH, a citizen of the United States, and a resident of Brooklyn, in the county of Kings and State of New York, have jointly invented certain new and useful Improvements in Vehicles, of which the following is a specification.

Our invention relates to vehicles.

It has for its object to improve the connections between the axle and the bed, to make them more flexible and give them greater freedom of movement, to furnish means for supporting cushioning devices between the bed and the axle of vehicles, to render such cushioning devices more efficient and durable, to give better play to the resilient qualities of such devices, to enable both spring and pneumatic cushioning devices to be used in the same vehicle, to permit the bed to be placed in a relatively low position and generally to improve the running gear of vehicles.

Our invention consists of the novel devices and combinations herein shown and described.

In the particular apparatus shown in the drawings accompanying this specification, our invention is shown in connection with an automobile, but it is not limited in its application to that class of vehicles, although it is of special importance in connection with any vehicles ordinarily using pneumatic tires, as it enables such pneumatic tires to be dispensed with, if desired. In the form of our invention shown in the drawings, both forms of cushioning devices, namely, spring cushioning devices and pneumatic cushioning devices, are shown combined, but in some aspects of our invention it is not essential that both be employed.
In the drawings accompanying this specification and forming a part hereof, we have shown our invention in its preferred form and as embodied in an automobile.

Referring now to such embodiment, Figure 1 is a side elevation of an automobile embodying our invention, the nearer wheels and some of their connections being removed to more clearly show the mechanism; Fig. 2 is a plan view of the bed of such automobile, the tonneau and connecting parts being not shown; Fig. 3 is a plan of the front axle, its axle frame and their connecting parts; Fig. 4 is a front elevation of the parts shown in Fig. 3, viewed as indicated by the arrow 4 and Fig. 5 is a similar view from the rear, viewed as indicated by the arrow 5 on Fig. 3; Fig. 6 is a vertical longitudinal section taken on the line 6—6 of Fig. 4; Fig. 7 is a side view of the part shown in Fig. 4, viewed as indicated by arrow 7
on Fig. 4; Fig. 8 is an end view of the pneumatic cushion and its connecting parts; Fig. 9 is a section taken on the line 9—9 of Fig 10; Fig. 10 is a side view of a pneumatic cushion with its connecting parts, this view being taken from the outside of the car; Fig. 11 is a partial view of the other side of the said pneumatic cushion taken from the center of the car; Figs. 12 and 13 represent a modification of the connections between the spring and the pressure transmitting member of the pneumatic cushion, Fig. 12 being an end and Fig. 13 a side view; Figs. 14, 15, 16 and 17 illustrate a modification of the connections between the axle and the pressure transmitting member, Fig. 14 being a side view of a pneumatic cushion and its connections with the axle in section, Fig. 15 being an end view of the same with the spring in cross-section, Fig. 16 being a side view of the apparatus as mounted on the front axle, one of the wheels being removed, and Fig. 17 being a similar view with a slightly different arrangement of the spring; Figs. 18, 19 and 20 illustrate a modification of the pressure transmitting member and its connections, Fig. 18 being a side view, Fig. 19 an end view of the same and Fig. 20 a plan, all unnecessary parts in these three figures being removed for purposes of clearness.

Referring now to the specific apparatus shown in the drawings, 1 is the bed or chassis of an automobile, 2 representing the tonneau and other parts mounted thereon.

3, 3 are the axles.

In the car shown in the drawings, two kinds of cushioning devices are shown and are preferably used by us in connection with each wheel, namely, a spring 6 and a pneumatic cushion 8. In some aspects of our invention, either one or the other may be used alone, if desired. Thus, for example, a pneumatic cushion may be alone employed or a spring may be alone employed, or in place of a pneumatic cushion, any suitable resilient means may be employed, if desired. As shown, each pneumatic cushion 8 is carried or supported by a support 9 connected to the axle 3, preferably rigidly secured to it. Each pneumatic cushion has resting upon it a pressure transmitting plate or member 10. This member transmits the pressure due to weight of the bed of the vehicle to its pneumatic cushion. It will of course, be understood that four pneumatic cushions and their connections will be provided, one at each end of each axle. Each pressure transmitting member 10 is preferably connected with the bed of the vehicle through a spring, shown as spring 6 and the connections between the pressure transmitting member and its spring are preferably flexible, as will be presently described, in order to permit of freedom of movement of the spring under different stresses. As shown, each pressure transmitting member 10 carries or supports its spring 6. The connections between the bed, axle, cushion supports and pressure transmitting members are such as to permit the support and the pressure transmitting member for each pneumatic cushion or other resilient means to freely move toward or away from each other to vary the pressure on such pneumatic cushion or other resilient means, but to cause the cushion support and its pressure transmitting member to move together in all other directions substantially as a unit, as will be presently described.

Each spring 6 is secured to the bed of the vehicle preferably so as to be capable of a bodily longitudinal movement thereon and in order to have the bed placed as low as possible the spring is preferably secured to one or more projections dependent from the bed of the vehicle. In the form of apparatus shown, the bodily longitudinal movement is obtained by means of a link 11 interposed between the spring and the bed or a dependent projection from the bed. Preferably such a link is employed at each end of the spring. Each link 11 is pivoted at one end to the spring 6 and at the other end to a dependent projection 12 from the bed of the vehicle. As shown, the rear link 11 of each spring 6 of the front axle is secured at its rear end to a bracket 12 extending downward from the bed 1 and at its forward end is secured to a downward projection 12 which is integral with the bed itself. By these means, the spring 6 and the member 10 by which it is carried can move longitudinally relatively to the bed as well as vertically.

The spring and member 10 by which the spring is carried are preferably connected so as to be slightly movable relatively to each other, thus making the connection a flexible one to permit the spring to adjust itself to different conditions and positions it may assume. In the form of apparatus shown in the drawings, each member 10 has two downward projections 13, 13 dependent from it, which carry at their lower end a part 14 which has two lugs 15, 15 dependent from it. Between these lugs extends spring 6.

16 is a saddle firmly secured to spring 6 by a clip or clips 17. Each clip 17 passes around the spring and is secured to saddle 16 by nuts 18, 18. Saddle 16 is pivoted in lugs 15 by means of studs 19, 19 integral with the saddle entering bearings in lugs 15. By these means, spring 6, through saddle 16, is free to rock in its bearings in the parts dependent from member 10. The flexible or movable connection between the pressure transmitting member and the spring can be obtained in other suitable ways, if desired, an illustration of which is given later on in this specification.

By means of the dependent projections 12 and the placing of the spring 6 in the lower part of member 10, the spring can be placed very low in the vehicle, thus enabling the body of the vehicle to be set low.

Each support 9 and its pressure transmitting member 10 are so arranged that while they shall be free to move toward and away from each other so as to bring the weight of the vehicle upon the pneumatic cushions 8 or other resilient means, they will be caused, in their movement in all other directions, to act substantially as a unit and to move together. This is accomplished in the particular form of our improvement shown in the drawings by making the support 9 fast with the axle 3 and by connecting the member 10 with the axle by means of a rod 20 pivoted to it at 14ᵃ and pivoted at 21 to a bracket 22 fast on axle 3. Preferably rod 20 for each member 10 is pivoted to the axle at the side of the vehicle opposite to its member 10. This connection permits member 10 to rise and fall in a substantially vertical line, but imparts any other movement of the axle to the support, such as the rocking or swinging of the axle on its axis or any lateral movement of the axle along its length or any longitudinal movement of the axle.

It will be understood that the member 10 on the opposite side of the vehicle is similarly provided with a rod 20 pivoted at 21 to a bracket 22 dependent from the axle at the side of the vehicle opposite such member 10. A similar arrangement is also provided for each of the members 10 of the rear axle of the vehicle.

From the foregoing, it will be understood that pressure, due to the weight of the body of the vehicle, is transmitted through the springs 6 to the pressure transmitting members 10 and through them to the pneumatic cushions 8, the supports 9 and the axles of the vehicle. In the form shown in the drawings, this pressure is transmitted through two different kinds of resilient or cushioning devices, namely, springs 6 and pneumatic cushions 8. At the same time, no side strains or stresses upon the pneumatic cushions 8 occur, as the support 9 and member 10 for each pneumatic cushion move in all directions substantially as a unit, except only toward and away from each other to permit compression or expansion of the pneumatic cushion.

In order to permit each axle to move vertically and slightly longitudinally in reference to the bed or, in other words, to rock with reference to the bed and at the same time to prevent any lateral displacement of the bed and axle relatively to each other and to permit each wheel to rise and fall somewhat independently of the other wheel on the same axle, we preferably provide the following described means: Each axle 3 is pivotally supported in an axle frame 23, the latter being connected with the bed or chassis 1 by means of radius rods 24, 24. The latter are pivoted at 25 to brackets 26, 26. The lower end of each radius rod 24 passes through an opening 27 in a projection from frame 23, the said projection being preferably split, as at 28, the split portions being held and fastened together by bolt and nut 29. The cross-section of radius rod 24 at this point and the cross-section of opening 27 are preferably made with square corners so as to make the frame 23 rigid with bed 1, except that frame 23 can rock upon pivots 25 in a plane parallel to the length of the vehicle. Each radius rod 24 also preferably passes through an opening in a lug 30, projecting from and integral with frame 23. By means of this lug and nuts 31, 31, frame 23 can be adjusted in any suitable position upon radius rods 24, in this manner adjusting the axle 3 longitudinally relatively to the bed.

Axle 3 is provided with a cylindrical stud 32 projecting into and having a bearing in a long sleeve 33 integral with axle frame 23. This may be either a piece integral with the axle itself or, as shown, a screw stud provided with exterior screw-threads to engage interior screw-threads in a nut 39 and inserted in a tapering opening 38 through axle 3. In the latter case, it is adjusted and secured by nut 39. Preferably sleeve 33 is not made in one continuous piece, but is shown in Fig. 6, with suitable bearing surfaces 40, 41, 42 between the various parts of the sleeve and collar 35 and axle 3. Preferably we also provide a yoke 34 having a collar 35 encircling stud 32. Yoke 34 is secured at its other end to axle 3 by means of bolts 36, 36 fast on the yoke and nuts 37. The purpose of the yoke and the great length of stud 32 and sleeve 33 is to give a greater bearing surface and to unite the axle and the axle frame more securely and to maintain the parts in their proper relative positions. It will be understood from the above that axle 3 is free to rock upon its central stud 32 in axle frame 23 in a plane at right angles to the length of the vehicle, thus permitting one wheel to rise or fall substantially independent of the other; also that, with the exception of this rocking movement, the axle and the axle frame will move together as a unit and that both of them will be free to rock relatively to the bed upon pivots 25 or, in other words, to move vertically and also slightly longitudinally with reference to the bed; while at the same time axle and bed will be rigid with each other so far as lateral movement or displacement is concerned.

A shown, cushion support 9 is secured to the axle by means of clips 43 encircling axle 3 and bolted to an extension 44 from lower support 9 by nuts 45.

46 represents driving shaft driving sprocket wheel 47, chain 48 and sprocket wheel 49 in the usual manner. As these are details forming no part of my invention, they will not be further described.

50 represents part of the steering apparatus, but as this also forms no part of our invention it will not be further described.

In Figs. 12 and 13 we have shown a modified form of connection between the spring 6 and the member 10, showing a slightly modified form of flexible or movable connection between the two. In this case, besides pivoting saddle 16, secured to the spring, in the parts dependent from upper support 10, we make it slidably mounted in such parts. The saddle 16 in this case is shown as pivoted at 19 in a sliding block 19$^a$, free to move in a guideway 17$^a$ in uprights 14$^b$ forming part of horizontal extensions 14$^c$ of dependent projections 13. As member 10 and the spring move and occupy different positions they adjust themselves to each other by means of these parts sliding upon each other, thus preventing any tendency to strain or break the spring.

Figs. 14, 15, 16 and 17 illustrate a modification of the connections between the axle and the pressure transmitting members. In this construction, the axle has toward each end an upwardly projecting lug 51 and a downwardly projecting lug 52, to each of which is pivoted a link 53. At the other end each link 53 is pivoted at 54 to a projecting portion 55 from the downward projections 13, 13. These connections permit each member 10 and the axle to move vertically or toward or away from each other, while at the same time tending to make axle 3 and cushion supports 9 and members 10 move in all directions together as a unit. This particular form of connection also tends to steady the members 10 in their movement. In Fig. 16 this form of connection is shown in combination with a spring 6, which has a link 11 at each end, as has been already described. In Fig. 17 the same connection is shown combined with a spring 6, which at one end is secured to the downward projection 12 from the bed, while at its other end it is provided with a link 11.

Figs. 18, 19 and 20 illustrate a modified form of pressure transmitting member and connections. In this form, the two members 10 at the opposite ends of an axle are connected by a rod 56, which at its center is pivoted at 57 to a frame 58, which frame is adapted to slide vertically on two upward projections or studs 59, 59 from the axle.

Our improved means of mounting the axle and connecting it with the bed by means of radius rods running inward at an angle to each other and to the length of the vehicle, make the connection between axle and bed a rigid and strong one so far as preventing lateral displacement is concerned. At the same time the use of the axle frame with the axle pivoted in it gives a very desirable independence between the wheels of an axle so far as surmounting articles in the road is concerned. The manner of connecting the pressure transmitting members with the axle and the cushion supports also makes a strong and rigid connection between the parts in all their movements other than the vertical ones.

In the particular automobile shown in the drawings, a chain drive is provided. It will, of course, be understood that where a shaft drive is employed it will be necessary to make a slightly different arrangement of the axle frame and radius rods. For example, in order to provide room for the shaft drive, the arrangement of axle frame, radius rods and axle should be substantially reversed from that shown in the drawings, the axle frame being pivoted to some part of the bed of the vehicle and the radius rods running from it toward the ends of the axle, where they should be fixed to the axle. In all substantial respects, this arrangement is the same as that shown in the drawings, the same rocking or tilting of the axle in a vertical plane, the same rocking or vertical movement of the axle relatively to the bed and the same strength or rigidity of the parts being secured as in the construction shown in the drawings.

By means of our improvements, a strong, easy running vehicle is secured, capable of having the bed of the vehicle placed low, and affording improved means for carrying pneumatic cushions or other resilient means between the axle and the bed of the vehicle and means which avoid all strain or stress upon such pneumatic cushions or resilient means. In practice, the action of the pneumatic cushions is so rapid that the level of the car will be maintained, notwithstanding slight irregularities in the road, thus giving a very easy riding vehicle.

Any suitable form of support or of pressure transmitting member for the pneumatic cushion or other resilient means may be employed, which will permit the free expansion and contraction of such pneumatic means. In practice we prefer to employ a plate as the form of the pressure transmitting member, and to employ for the support an irregularly curved or hollowed-out plate, such for example, as is shown in the drawings. We prefer also to positively fasten or secure the pneumatic cushion to the support. Such means are illustrated in Fig. 10, and consist of bolts 60, with heads 62 and nuts 61, the bolts passing through openings in support 9 and the wall of pneumatic cushion 8, the heads 62 being vulcanized, as shown, to prevent leakage.

In practice, we prefer to use a pneumatic cushion which is upwardly curved or arched between its ends and extending longitudinally of the bed, as shown, and in conjunction with this to use, as the pressure transmitting member, a flat plate. This gives a bearing surface between the pressure transmitting member and the pneumatic cushion, which varies with the amount of pressure exerted upward or downward, dependent upon the irregularities in the road. This gives a greater range of cushioning action to the pneumatic cushion. Thus no matter what the weight in the vehicle, the bearing surfaces will adjust themselves in accordance therewith and this with but slight increase of internal pneumatic pressure in the cushion.

In the form of devices shown in the drawings the springs carried by the pressure transmitting members are shown as semi-elliptical springs. We do not limit ourselves, however, to the use of such a spring in this connection, as any suitable spring may be employed adapted for the purpose.

Many other modifications in or departures from the specific embodiment of our invention shown in the drawings than those described and referred to herein can, of course, be made without departing from our invention, the essentials of which are set forth in the claims appended hereto.

What we claim as new and desire to secure by Letters Patent, is:—

1. In a vehicle the combination of a spring secured to the bed of the vehicle so as to be capable of a bodily longitudinal movement thereon, an axle, a pneumatic cushion, a member having an upper transverse portion by which it is suspended from said pneumatic cushion and connected to and carrying the said spring at its lower end so as to transmit pressure due to weight of the vehicle to the pneumatic cushion, and a member supporting the pneumatic cushion and transmitting pressure from it to the axle, the said members being so shaped and arranged as not to confine the pneumatic cushion but to leave it unconfined and free to change its shape under varying pressures and connections permitting the two pressure transmitting members to move toward or away from each other to vary the pressure on the cushion but compelling them in all other directions to move together substantially as a unit.

2. In a vehicle the combination of a bed, a spring, a link secured to each end of the spring and pivoted to the bed so as to permit of a bodily longitudinal movement of the spring relatively to the bed, an axle, a pneumatic cushion supported upon the axle, a member adapted to rest upon the pneumatic cushion, and a saddle secured to the spring and pivoted to the said member, whereby pressure will be transmitted through the spring, member and pneumatic cushion to the axle and the spring will be flexibly connected to the said member.

3. In a vehicle the combination of a pneumatic cushion, a member movably connected with the bed and resting upon the pneumatic cushion and adapted to transmit to the pneumatic cushion pressure due to weight of the bed, and a rod connected to the member and pivotally connected to the axle permitting the member to move toward and away from the axle but compelling it to move with the axle in all other directions.

4. In a vehicle the combination of a bed, an axle, a pneumatic cushion toward each end of the axle, a support for each pneumatic cushion secured to the axle, a pressure transmitting member resting upon each pneumatic cushion, a spring for each pressure transmitting member, flexible connections between each member and its spring, a link secured to each end of each spring and pivoted to the bed of the vehicle so as to permit of a bodily longitudinal movement of the spring and its pressure transmitting member relatively to the bed, and a rod connected to each pressure transmitting member and pivoted to the axle at the side of the vehicle opposite to its pressure transmitting member, whereby pressure due to weight of the vehicle will be transmitted to the axle through the springs, pressure transmitting members, pneumatic cushions and supports and whereby the pressure transmitting member and support for each pneumatic cushion will be free to move toward and away from each other to vary the pressure on the cushion but will be caused to move together in all other directions substantially as a unit.

5. In a vehicle the combination of an axle frame, connections between the frame and the bed of the vehicle adapted to permit the frame to rock in a vertical plane parallel to the length of the vehicle but preventing lateral movement of the frame and bed relatively to each other, and an axle pivoted at its center to the frame so as to rock on its center in a vertical plane at right angles to the length of the vehicle.

6. In a vehicle the combination of an axle frame, connections between the frame and the bed of the vehicle adapted to permit the frame to rock in a vertical plane parallel to the length of the vehicle but preventing lateral movement of the frame and bed relatively to each other, and an axle pivoted at its center to the frame so as to rock on its center in a vertical plane at right angles to the length of the vehicle, a pneumatic cushion, a support for the same carried by the axle, a pressure transmitting member resting upon the pneumatic cushion and movably connected with the bed and adapted to transmit pressure from the bed to the pneumatic cushion, and connections between the pressure transmitting member and the support for the cushion adapted to permit them to move toward or away from each other to vary the pressure on the cushion and adapted to cause them to move together in all other directions substantially as a unit.

7. In a vehicle the combination of an axle frame, connections between the frame and the bed of the vehicle adapted to permit the frame to rock in a vertical plane parallel to the length of the vehicle but preventing lateral movement of the frame and bed relatively to each other, an axle pivoted at its center to the frame so as to rock on its center in a vertical plane at right angles to the length of the vehicle, a pneumatic cushion, a support for the same carried by the axle, a pressure transmitting member resting upon the pneumatic cushion and movably connected with the bed so as to transmit pressure from the bed to the cushion, and a rod connected with the pressure transmitting member and pivoted to the axle at the side of the vehicle opposite to such member and adapted to permit the pressure transmitting member and support for the cushion to move toward or away from each other to vary the pressure on the cushion and adapted to cause them to move together in all other directions substantially as a unit.

8. In a vehicle the combination of an axle frame pivoted to the bed of the vehicle, an axle pivoted at its center to said frame, and means for adjusting the axle frame and the axle relatively to each other longitudinally of the vehicle.

9. In a vehicle the combination of a pneumatic cushion, a support therefor carried by the axle, a pressure transmitting member resting upon the cushion, the said member and the support for the cushion being free to move toward or away from each other to vary the pressure on the cushion but connected so that in all other directions they will move together, a spring connected to the bed of the vehicle so as to be capable of a bodily longitudinal movement thereon, and a saddle secured to said spring and pivoted to the pressure transmitting member, whereby the spring may be free to move longitudinally of the bed and may rock slightly on the pressure transmitting member and whereby pressure due to weight of the vehicle will be transmitted to the axle through the spring, the pressure transmitting member, the pneumatic cushion and its support.

10. In a vehicle the combination of an axle, an axle frame pivoted thereto, a bed, and two radius rods pivoted to the bed and connected with the axle frame and running at an angle to each other and to the length of the vehicle.

11. In a vehicle the combination of an axle, an axle frame pivoted thereto, a bed, and a radius rod pivoted to one side of the bed and connected with the axle frame and running at an angle to the length of the vehicle.

12. In a vehicle the combination of a bed, an axle frame, an axle pivoted at its center to the axle frame and free to rock thereon in a vertical plane at right angles to the length of the vehicle, and two radius rods pivoted to the bed at opposite sides and running inward at an angle to each other and to the length of the vehicle and connected with the axle frame.

13. In a vehicle the combination of a bed, an axle frame, an axle pivoted at its center to the axle frame, two radius rods pivoted to the bed at opposite sides thereof and running inward at an angle to each other and to the length of the vehicle and connected with the axle frame, a pneumatic cushion for each end of the axle, a support for each pneumatic cushion connected with the axle, a pressure transmitting member for each pneumatic cushion resting upon such cushion, a spring for each pressure transmitting member flexibly connected to such member and adapted to transmit pressure due to weight of the vehicle to such member and through it to the pneumatic cushion, a link secured to each end of each spring and pivoted to the bed of the vehicle so as to permit of a bodily longitudinal movement of the spring and its pressure transmitting member relatively to the bed, and a rod connected to each pressure transmitting member and pivoted to the axle at the side of the vehicle opposite to its member, whereby pressure due to weight of the vehicle will be transmitted to the axle through the links, springs, pressure transmitting members, pneumatic cushions and their supports and whereby the pressure transmitting member and support for each cushion will be free to move toward and away from each other but will be caused to move together in all other directions substantially as a unit.

14. In a vehicle the combination of a bed, an axle, a pneumatic cushion, a support for the same connected with the axle, means for positively securing the pneumatic cushion to the support, a pressure transmitting member movably connected with the bed by springs secured to its lower end and adapted to transmit to the pneumatic cushion pressure due to weight of the bed, the support and pressure transmitting member for the pneumatic cushion being so connected and arranged as to be free to move toward and away from each other but to move together as a unit in all other directions and being so shaped and arranged as not to confine the pneumatic cushion but to leave it unconfined and free to change its shape under varying pressures.

In testimony whereof, we have signed our names to this specification, in the presence of two subscribing witnesses.

THEODORE A. KLENKE.
FRANK N. ROEHRICH.

Witnesses:
JOHN O. GEMPLER,
EDWIN SEGER.